H. B. FERNALD.
Car Wheel.
No. 91,926. Patented June 29, 1869.
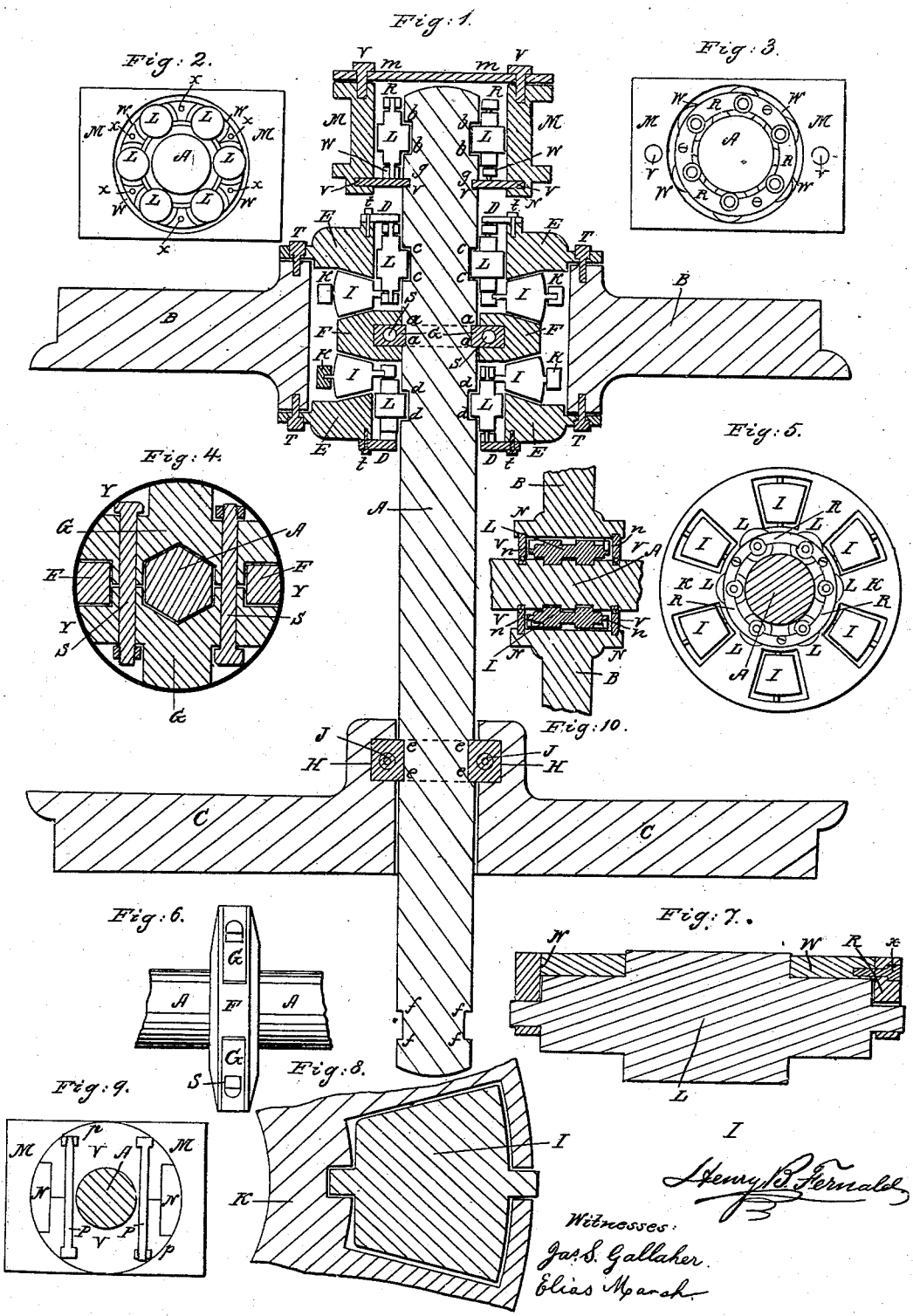

United States Patent Office.

HENRY B. FERNALD, OF DEDHAM, MASSACHUSETTS.

Letters Patent No. 91,926, dated June 29, 1869; antedated June 19, 1869.

---

IMPROVED CAR-WHEEL.

---

The Schedule referred to in these Letters Patent and making part of the same.

---

*To all whom it may concern:*

Be it known that I, HENRY B. FERNALD, of Dedham, in the county of Norfolk, and State of Massachusetts, have invented a new and improved Mode of Attaching Car-Wheels to their Axles, of which I declare the following to be a full, clear, and exact description, reference being made to the accompanying drawings, forming a part of this specification, in which—

Figure 1 is a horizontal section of a pair of car-wheels, B and C, with their axle A and box M;

Figure 2, a transverse section of the box M, with the anti-friction rollers L, arranged upon the axle A therein, taken across the larger bearing-portions of said rollers;

Figure 3, another transverse section of the box M, showing the guide-carriage W, which holds the rollers L, as arranged upon the axle A;

Figure 4, a section of the hub F, attached to the axle A by the key-blocks G, screw-bolts S, with nuts $n$, and the tire Y Y Y;

Figure 5, an elevation of the combined guide-carriage K with the radial anti-friction wheels I and anti-friction rollers on the axle A;

Figure 6, a front elevation of the hub F upon the axle A;

Figure 7, a longitudinal section of one of the anti-friction rollers L and a portion of the guide-carriage W, enlarged;

Figure 8, a vertical section of one of the radial anti-friction wheels I, with a part of the combined guide-carriage K, enlarged; and Figure 9, a section of the hub N attached to the box M, and secured to the axle A by the key-blocks V, screw-bolts P, and nuts $p$.

The nature of my invention consists in firmly attaching, upon the axle A, a hub, F, constructed with a transverse mortise or opening for the key-blocks G, which, entering upon opposite sides of said mortise, unite upon the journal $a\ a\ a\ a$, made by squaring the axle A four or more square, as desired, where they are secured by the screw-bolts S passing through both blocks on opposite sides of the axle A and the nuts $n$.

The tire Y Y Y may be employed upon the hub F, to more perfectly secure the key-blocks G in their position.

The key-blocks G, when united, present an aperture conforming to the squared journal $a\ a\ a\ a$, upon which they unite.

Upon each side of the hub F are arranged, in the combined guide-carriage K, a series of radial anti-friction wheels, I, bearing upon the sides of the hub F, and a series of anti-friction rollers L, each constructed with two bearing-portions of different diameters, the smaller rolling upon the axle A, and the larger rotating in the journals $c\ c\ c\ c$ and $d\ d\ d\ d$, which are turned deep enough for them to revolve without contact with the axle A.

The smaller bearing-portions of the rollers L are proportioned to the larger, as the axle A is to the aperture in which they are to be placed.

When the radials I and rollers L are arranged with the combined guide-carriages K, they should be so proportioned that the former shall make the same number of revolutions to each turn of the wheel B, as the latter; but this proportion need not be observed when the guide-carriages W, hereinafter to be described, are employed with the rollers L and independent carriages with the radials I.

The combined guide-carriage K, employed to keep the radials I and rollers L in their proper positions, is constructed of a simple plate or wheel having a central opening large enough to permit its independent revolution around the axle A and openings for the radials I. Above and below the last-named openings, bearings are provided in the plate for the journals of the radials I; and from one side of said plate, arms are projected the length of and between the rollers L, to which the ring R is attached by screws.

Equidistant bearings are provided for the journals of the rollers L in the plate and in the ring R.

The axle A, provided with the hub F and the series of radials I and rollers L, as above described, is placed within the open hub of the wheel B. The collars E, each provided with a central aperture large enough to receive the larger bearing-portions of the rollers L, as arranged upon the axle A, are placed upon said rollers, and, by the screws T, secured to the wheel B.

The washers D are attached to the collars E by the screws $t$, as a protection against dust, and to prevent the outflowing of the oil.

The inward faces of the collars E and the sides of the hub F are made slightly convex, to conform to the surfaces of the radial wheels I.

The wheel C is provided with a hub, H, constructed with a transverse mortise for the key-blocks J, by which, with the screw-bolts $o$, it is firmly secured upon the squared journal $e\ e\ e\ e$ of the axle A, in the same manner as the hub F, hereinabove described.

A series of the anti-friction rollers L is also arranged in the guide-carriage W, near the end of the axle A, substituting, for the usual journal, the journal $b\ b\ b\ b$, turned deep enough to permit the larger portions of the rollers L to revolve without contact with the axle; and the end of the axle, with the rollers arranged thereon, is placed in the circular aperture provided for them in the box M.

The guide-carriage W is constructed of a plate or ring having an aperture large enough for it to revolve independently around the axle A, and with arms extending from one side, the length of and between the rollers L, to which the ring R is attached by the screws $x$, proper equidistant bearings being provided in both rings for the journals of the rollers L.

The box M is provided with a hub, N, on its inner end, constructed with a transverse mortise for the key-blocks V, which entering upon opposite sides of said mortise, unite upon the turned journal $g\ g$ in the axle A, where they are secured by the screw-bolts P and nuts $p$, substantially in the same manner as the key-blocks G, in the hub F, hereinbefore described.

The key-blocks V, when united, present a circular opening to the journal $g\ g$, thus preventing the lateral motion of, while allowing free rotation to the axle A within the box M.

The wheel B may be constructed with the hubs N, secured upon the axle A, by the key-blocks V and screw-bolts, in the same manner as the hub N of the box M, and revolve upon one or more sets of the anti-friction rollers L, arranged in the guide-carriage W, as shown in fig. 10.

The axle A may be constructed of smaller diameter by welding, or otherwise attaching to it, cylindrical rings, of sufficient thickness, and at proper distances apart, to form the bearings for the smaller bearing-portions of the rollers L to roll upon, and furnish the necessary journals or openings for the larger portions to revolve in without contact with the axle.

What I claim specifically as my invention, and desire to secure by Letters Patent, is—

1. The hub F, constructed with a transverse mortise for the key-blocks G, in combination with the key-blocks G, the squared journal $a\ a\ a\ a$ of the axle A, the screw-bolts S, and nuts $n$, with or without the tires Y Y Y, substantially as herein described.

2. The wheel O, in combination with the hub H, constructed with a transverse mortise for the key-blocks J, the key-blocks J, the squared journal $e\ e\ e\ e$, and the screw-bolts $o$, substantially as herein set forth.

3. The hub N, constructed with a transverse mortise for the key-blocks V, in combination with the key-blocks V, the round journal $g\ g$, and the screw-bolts P, and nuts $p$, all arranged and applied to the axle-box, substantially as and for the purposes herein specified.

4. The combined guide-carriages K K, constructed as herein specified, and in combination with the anti-friction rollers L, and radial anti-friction wheels I, the whole being held in place, substantially as herein described.

5. The wheel B, in combination with the collars E, the radial anti-friction wheels I, the anti-friction rollers L, the guide-carriages K, and the hub F, the whole constructed and secured upon the axle A, as herein described, substantially as herein set forth.

HENRY B. FERNALD.

Witnesses:
JNO. S. GALLAHER,
ELIAS MARSH.